United States Patent [19]
Ariga et al.

[11] 3,753,573
[45] Aug. 21, 1973

[54] VEHICLE BODY STRUCTURE

[75] Inventors: Taiji Ariga, Suginami-ku, Tokyo; Tatsumi Tsukikawa, Chiyoda-ku, Tokyo; Hiroshi Ito, Ohta-ku, Tokyo, all of Japan

[73] Assignee: Nissan Motor Company, Limited, Yokohama City, Japan

[22] Filed: July 23, 1971

[21] Appl. No.: 165,047

[30] Foreign Application Priority Data
Aug. 31, 1970 Japan.................................. 45/76131
Aug. 31, 1970 Japan.................................. 45/76132
Aug. 31, 1970 Japan.................................. 45/86669

[52] U.S. Cl............................ 280/106.5, 280/124 A
[51] Int. Cl.............................................. B60g 11/00
[58] Field of Search...................... 280/106.5, 124 A

[56] References Cited
UNITED STATES PATENTS
2,638,356   5/1953   Butterfield................... 280/106.5 R
3,169,026   2/1965   Soer............................. 280/106.5 R

*Primary Examiner*—Philip Goodman
*Attorney*—Robert E. Burns et al.

[57] ABSTRACT

A vehicle body structure is disclosed which provides a strengthened support for a strut suspension and an increased rigidity of a vehicle body. The strut suspension is supported by a member attached to a box-girder structure extending longitudinally of the vehicle body and rigidly secured to any structural member, such as a front pillar, of the vehicle body. The box-girder structure may preferably be narrowed toward its foremost end so as to be collapsible when subjected to a forceful mechanical stress during collision of the motor vehicle. Arrangements may also be made so that the vehicle body structure can be assembled in a simplified manner.

18 Claims, 7 Drawing Figures

VEHICLE BODY STRUCTURE

This invention is generally concerned with motor vehicles and, more particularly, to a vehicle body structure for use in a motor vehicle having a strut suspension.

It is presently an ordinary practice to have the strut suspension supported by a member connected to a dashboard which acts merely as a partition panel intervening between an engine compartment and a cabin, not as a structural member of a vehicle body. The term "structural member" herein used is intended to refer to a member which lends itself to sharing in a mechanical strength of the vehicle body. Only an outer structural member of a front side panel defining the engine compartment is connected to a front pillar (which is one of the structural members of the vehicle body) through a cowl top member.

In the conventional vehicle body structures, therefore, not only the strut suspension is not suspended with a sufficient strength but the vehicle body *per se* is not fully resistant to external forces exerted thereon. The connection between the suspension support and the dashboard further results in substantial reduction in an effective space in the engine compartment, giving rise to the space requirement of the engine.

It is, thus, an object of this invention to provide an improved vehicle body structure which is adapted to overcome these and other drawbacks thus far inherent in the existing vehicle body structures using strut suspensions.

Another object of the invention is to provide an improved vehicle body structure offering a strengthened support for the strut suspension and a sufficient rigidity of the vehicle body.

Still another object of the invention is to provide an improved vehicle body structure providing an ample space in the engine compartment so as to lessen the space requirement of the engine.

The vehicle body structure to accomplish these objects is made up of a box-girder structure extending generally longitudinally of the vehicle body and rigidly secured at its rear end to a structural member forming part of the vehicle body and a suspension support member supporting the strut suspension and rigidly secured to inner faces of the box-girder structure.

To absorb an impact exerted on the vehicle body during frontal collision of the motor vehicle, the box-girder structure may be narrowed toward its foremost end so as to be collapsible when subjected to a forceful stress applied thereto rearwardly.

The box-girder structure may be constructed by various initially separate component parts which are to be welded together when in the assembling of the vehicle body structure according to this invention. This will significantly facilitate the welding operation which would otherwise involve rather intricate skills for assembling.

Drawings illustrate embodiments of this invention in which.

Figure 4:
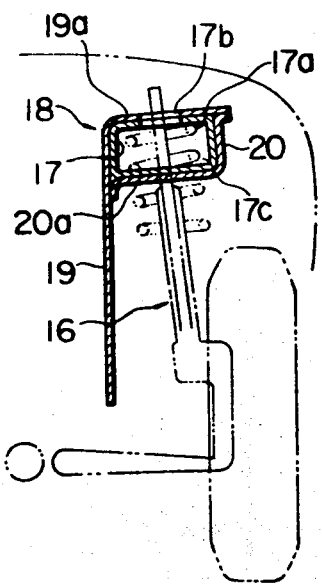
FIG. 4 is an enlarged cross sectional view taken on line IV—IV of FIG. 1.

Continuing reference is now made to the accompanying drawings in which like reference numerals designate corresponding parts. Referring initially to FIGS. 1 to 5, the vehicle body in which the improvement according to this invention is to be incorporated is illustrated to include a dashboard 10 separating an engine compartment 11 from a cabin 12, a cowl top member 13, a front pillar 14 constituting a structural member of the vehicle body, and a windshield pane 15. The vehicle body suspends a strut suspension 16 by means of a suspension support 17 and a box-girder structure 18, as best seen in FIG. 4.

Figure 3:
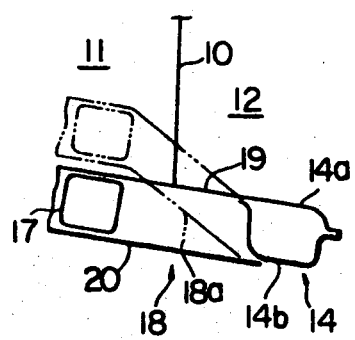
FIG. 3 is a schematic longitudinal sectional view taken on line III—III of FIG. 1.
Figure 5:
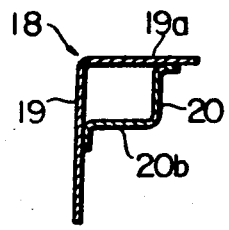
FIG. 5 is a detailed cross sectional view taken on line V—V of FIG. 1.

The box-girder structure 18 constitutes a front side panel of the engine compartment 11 and includes an inner structural member 19 and an outer structural member 20. The inner structural member 19 has its upper portion sidewise bent outwardly so as to form an upper end wall 19a, while the outer structural member 20 has its lower portion sidewise bent inwardly to form a lower end wall 20a. As clearly seen in FIGS. 4 and 5, the inner and outer structural members are rigidly secured or welded to each other at end edges of these upper and lower endwalls 19a and 20a, respectively, thereof so as to form a generally equilateral cross section. The box-girder structure 18 thus constructed extends generally longitudinally of the vehicle body and is rigidly secured or welded at its rearmost end to any structural member, such as a front pillar 14 as shown, of the vehicle body. Where the box-girder structure 18 is secured to the front pillar 14 which usually includes inner and outer walls 14a and 14b, respectively, the inner and outer structural members of the box-girder structure may be connected to these inner and outer walls, respectively, of the front pillar as seen in FIG. 3.

The suspension support 17, on the other hand, includes a top wall 17a which is secured to the inner face of the upper end wall 19a of the inner structural member 19 as best seen in FIG. 4. The support 17 has its side walls (not numbered) gripped between the inside faces of the inner and outer structural members 19 and 20, respectively. The strut suspension 16 is supported by this suspension support 17 through a hole 17b formed in the top wall 17a and an open end 17c of the support.

With this arrangement in which the suspension support 17 and the box-girder structure 18 are combined to form and integral unit, traction and thrust which are transferred to the suspension support 17 from the strut suspension 16 are reasonably carried to the front pillar 14 which is a major structural member of the vehicle body, with the result that the strut suspension can be supported with a sufficient strength. Because, moreover, the box-girder structure 18 as it is served as a reinforcement for the vehicle body, the vehicle body has a sufficient rigidity that withstands considerable mechanical stresses imparted to the vehicle body. In contrast to the conventional vehicle body structure in which the space in the engine compartment is restricted by the connection between the front side panel and the front pillar through the cowl top member, the shown arrangement is advantageous in that the effective space in the engine compartment is increased through direct connection between the box-girder structure and the front pillar.

If desired, the front pillar 14 may be provided with an extension directed forwardly so that the box-girder structure 18 is secured to the foremost end portion of this extension. Where the strut suspension 16 is located out of alignment with the front pillar 14, then the box-girder structure 18 may include a portion 18a which is directed (bent or curved) to the front pillar or its extension if any, as indicated by phantom lines in FIG. 3.

Figure 1:
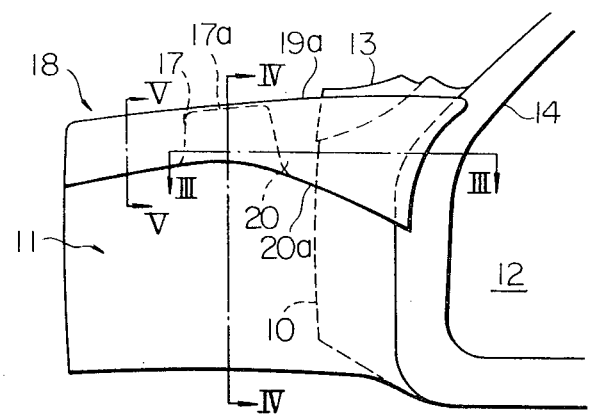
FIG. 1 is a side-elevational view showing a general construction of a vehicle body structure according to this invention.
Figure 2:
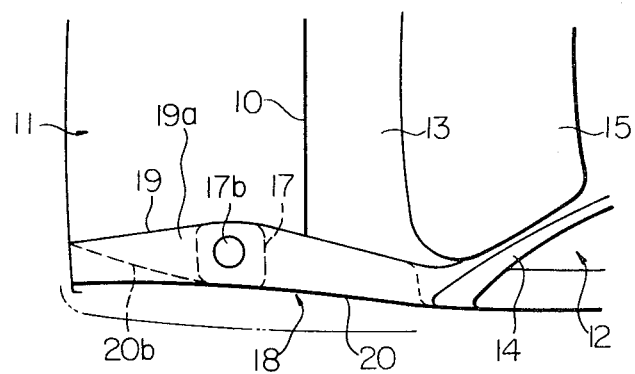
FIG. 2 is a top plan view showing the construction of FIG. 1.

The box-girder structure 18 can be modified so as to suit the purpose of absorbing an impact which is exerted on the vehicle body in the event of a frontal collision of the motor vehicle. For this particular purpose, the box-girder structure 18 may be reduced or narrowed toward its foremost end so that the structure is collapsible in its fore portion when subjected to a stress directed rearwardly of the vehicle body. In FIG. 2, the box-girder structure 18 is shown to have its outer structural member 20 curved inwardly in its fore portion 20b until the foremost ends of the inner and outer structural members meet each other.

Figure 6:
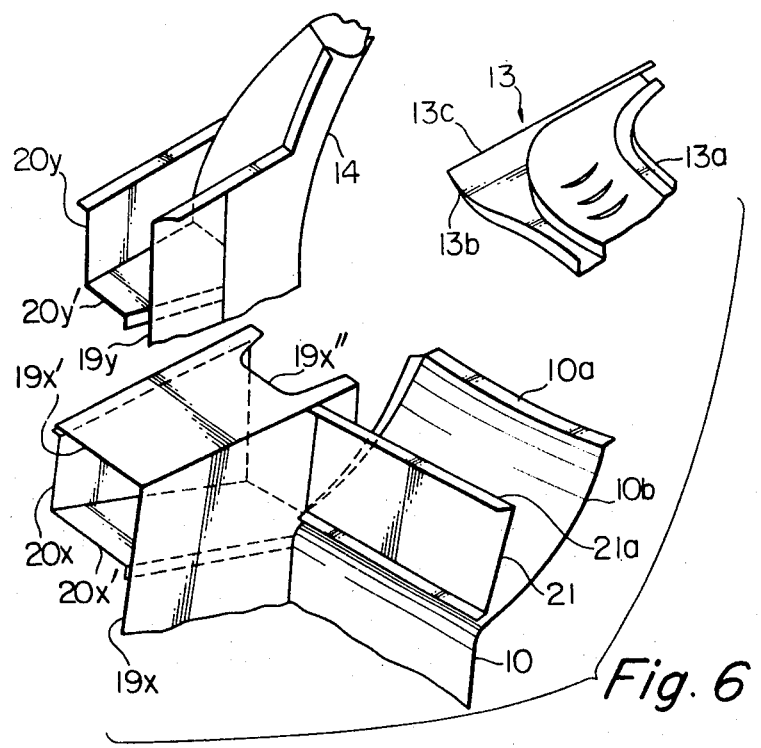
FIG. 6 is an exploded perspective view showing essential structural elements of a modification of the vehicle body structure shown in the preceding figures.
Figure 7:
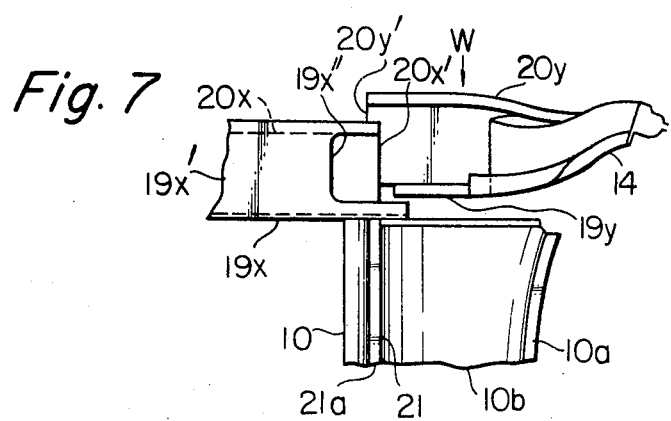
FIG. 7 is a plan view of the structural elements of FIG. 6, presented to illustrate general schemes of the assembling of the vehicle body structure in a simplified manner.

FIGS. 6 and 7 now illustrate a vehicle body structure which is basically similar to the arrangement thus far described and which can be assembled in a simplified manner.

The modified vehicle body structure has a box-girder structure in which each of the inner and outer structural members is made up of fore and rear parts which are welded together. The inner structural member consists of a fore part 19x having an outwardly bent upper end wall 19x' and a rear part 19y welded to the front pillar 14. The outer structural member, on the other hand, consists of a fore part 20x having an inwardly bent wall 20x' and a rear part 20y having an inwardly bent end wall 20y' and welded to the front pillar 14. The fore parts 19x and 20x of the inner and outer structural members, respectively, extend forwardly of the vehicle body and are welded together at end edges of the upper and lower end walls 19x' and 20x', respectively, thereof. The rear parts 19y and 20y of the inner and outer structural members, respectively, are welded together at an end edge of the lower end wall 20y'. The unit comprising the fore parts 19x and 20x is welded to the unit comprising the rear parts 19y and 20y through their end portions, thereby forming an integral box-girder structure. In order to permit an operator to have an access to the interior of the box-girder structure during welding operation for assembling, a recess 19x'' may be formed in the rear end portion of the upper end wall 19x' of the fore part 19x.

The dashboard 10 and a connecting member 21 attached thereto are welded to the fore part 19x of the inner structural member. The unit of the rear parts 19y and 20y is welded to the unit of the fore parts 19x and 20x in a direction of arrow W as indicated in FIG. 7.

To further facilitate welding the two initially separate units to each other, either of the fore parts 19x and 20x may be made longer than the other end, at the same time, the rear part to be welded to the former may be made shorter than the rear part to be welded to the latter. In FIGS. 6 and 7, the fore part 19x of the inner structural member is shown as longer than the fore part 20x of the outer structural member while the rear part 19y of the inner structural member is shown to be shorter than the rear part 20y of the outer structural member, by way of example.

The dashboard 10 and the connecting member 21 associated therewith are welded at their upper end edges 10a and 21a respectively to rearmost and foremost edges 13a and 13b of the cowl top member 13 so as to close a space defined between a curved upper portion 10b of the dashboard 10 and the connecting member 21. This cowl top member 13, furthermore, may have its raised side edge 13c welded to an upper end edge of the rear part 20y of the outer structural member thereby to overlie the recess 19x'' which consequently is isolated from the outside.

While preferred embodiments have been described by way of example, the vehicle body structure according to this invention may be modified in numerous ways depending upon practical requirements and preferencs so as to have available a further increased mechanical strength of the suspension support and/or the vehicle body and to further facilitate the assembly of the vehicle body structure. Emphasis may be placed on the fact that, although the box-girder structure is shown as connected to the front pillar, such structure can be connected to any structural member of the vehicle body insofar as the structural member has a sufficient mechanical strength which is greater than that of the dashboard.

What is claimed is:

1. A vehicle body structure in a vehicle body having a strut suspension and a front pillar, comprising a box-girder structure disposed on the side of the vehicle body and extending generally longitudinally of the vehicle body, said box-girder structure rigidly secured at its rear end to said front pillar and having therein a portion receiving an upper portion of said strut suspension.

2. A vehicle body structure according to claim 1, in which said box-girder structure is narrowed toward its foremost end for collapsing when subjected to a rearward mechanical stress.

3. A vehicle body structure according to claim 1, in which said box-girder structure comprises a fore portion having therein a portion receiving the upper portion of said strut suspension and a rear portion formed integrally with said fore portion which extends generally rearwardly and obliquely to the longitudinal direction of the vehicle body and which is secured at its rear end to said pillar.

4. A vehicle body structure according to claim 1, in which said box-girder structure comprises an inner structural member having an upper end wall sidewise bent outwardly and an outer structural member having a lower end wall sidewise bent inwardly, said inner and outer structural members rigidly secured to each other at end edges of said upper and lower end walls of said inner and outer structural members, respectively thereby defining a box shape.

5. A vehicle body structure according to claim 4, in which each of said inner and outer structural members comprises a fore part extending forwardly and a rear part secured to said front pillar and welded to said fore part.

6. A vehicle body structure according to claim 5, in which said fore part of said inner structural member has means defining a recess formed in a rearmost portion of its upper end wall providing an access to a space defined by the fore and rear parts of said inner and outer structural members during welding operation for the assembling of said vehicle body structure.

7. A vehicle body structure according to claim 5, wherein one of the fore parts is longer than the other and the rear part to be welded to said one fore part is shorter than the rear part to be welded to the other fore part.

8. A vehicle body structure according to claim 5, comprising a dashboard forming part of said vehicle body and a connecting member attached to said dashboard defining a space therebetween and both welded to the fore part of said front pillar.

9. A vehicle body structure according to claim 8, further comprising a cowl top member having a rearmost end and a foremost end welded to both said dashboard and said connecting member to close said space.

10. A vehicle body structure according to claim 9, in which said cowl top member has a raised side edge welded to an upper end of the rear part of said front pillar.

11. A vehicle body structure according to claim 1, in which said front pillar includes a forward extension Which forms part of said box-girder structure.

12. In a vehicle body having a strut suspension and a front pillar; a box girder disposed on the side of said vehicle body and having one end portion rigidly secured to said front pillar and extending longitudinally therefrom and connected to an upper portion of said strut suspension.

13. In a vehicle body according to claim 12, wherein said box girder is disposed obliquely with respect to said vehicle body.

14. In a vehicle body according to claim 12, wherein the other end portion of said box girder has a narrower cross-section than the remaining portion to enable said box girder to collapse upon the application of a force in a direction towards said one end portion.

15. In a vehicle body according to claim 12, wherein said box girder comprises an inner member having an L-shaped cross-section, and an outer member having an L-shaped cross-section and rigidly secured to said inner member along the length thereof thereby defining a box-shaped cross-section.

16. In a vehicle body according to claim 15, wherein each of said inner and outer memebers comprises a fore piece, and a rear piece having one end portion rigidly connected to said front pillar and another end portion rigidly connected to said fore piece.

17. In a vehicle body according to claim 16, wherein said fore piece has means therein defining an aperture disposed at the end portion connected to said rear piece for providing access during the connection of the two pieces.

18. In a vehicle body according to claim 16, wherein one of said inner and outer members of said fore piece is longer than the other and the other one of said inner and outer members of said rear piece is longer than the other thereby enabling the two pieces to be connected.

* * * * *